Figure 1:
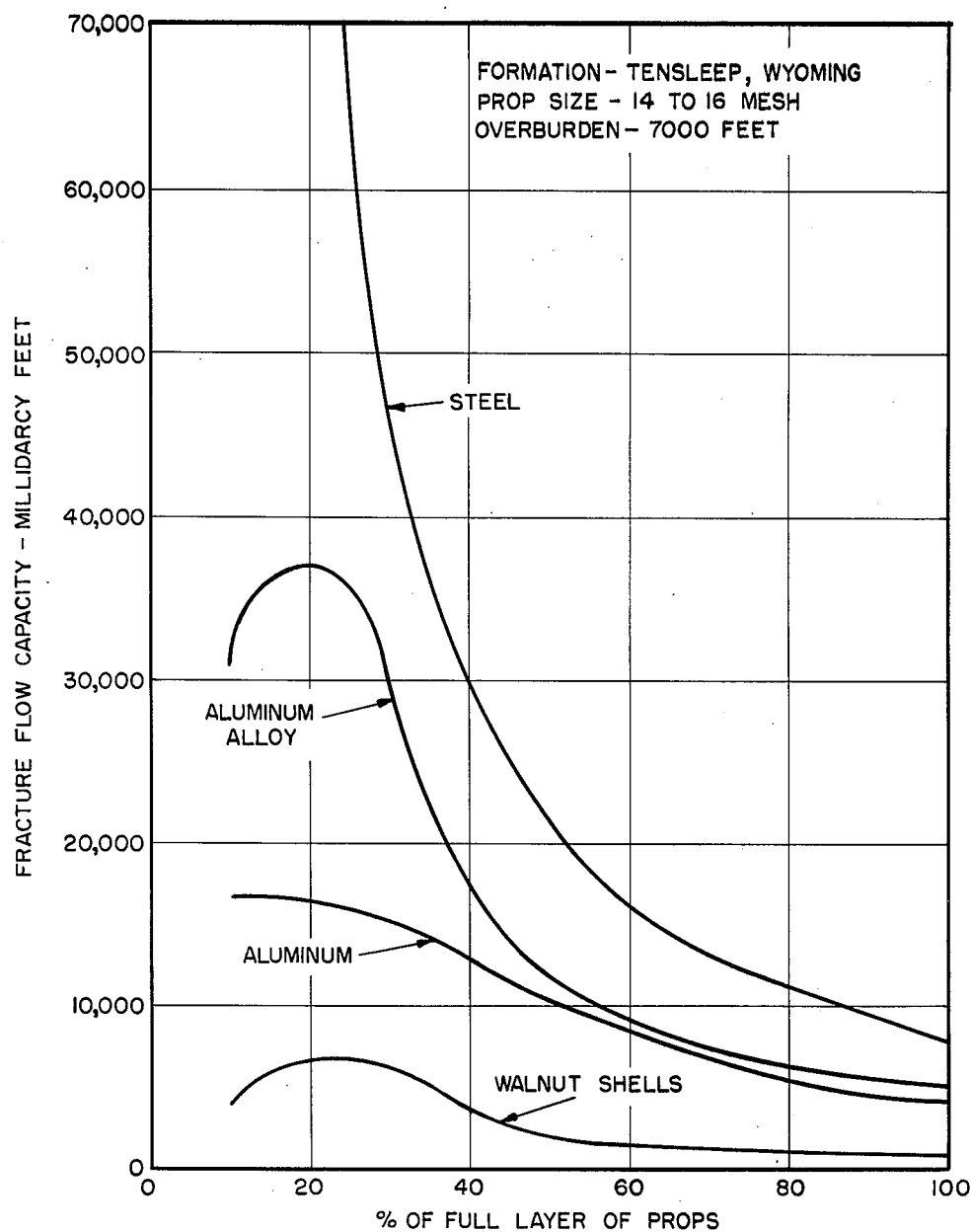
Figure 2:
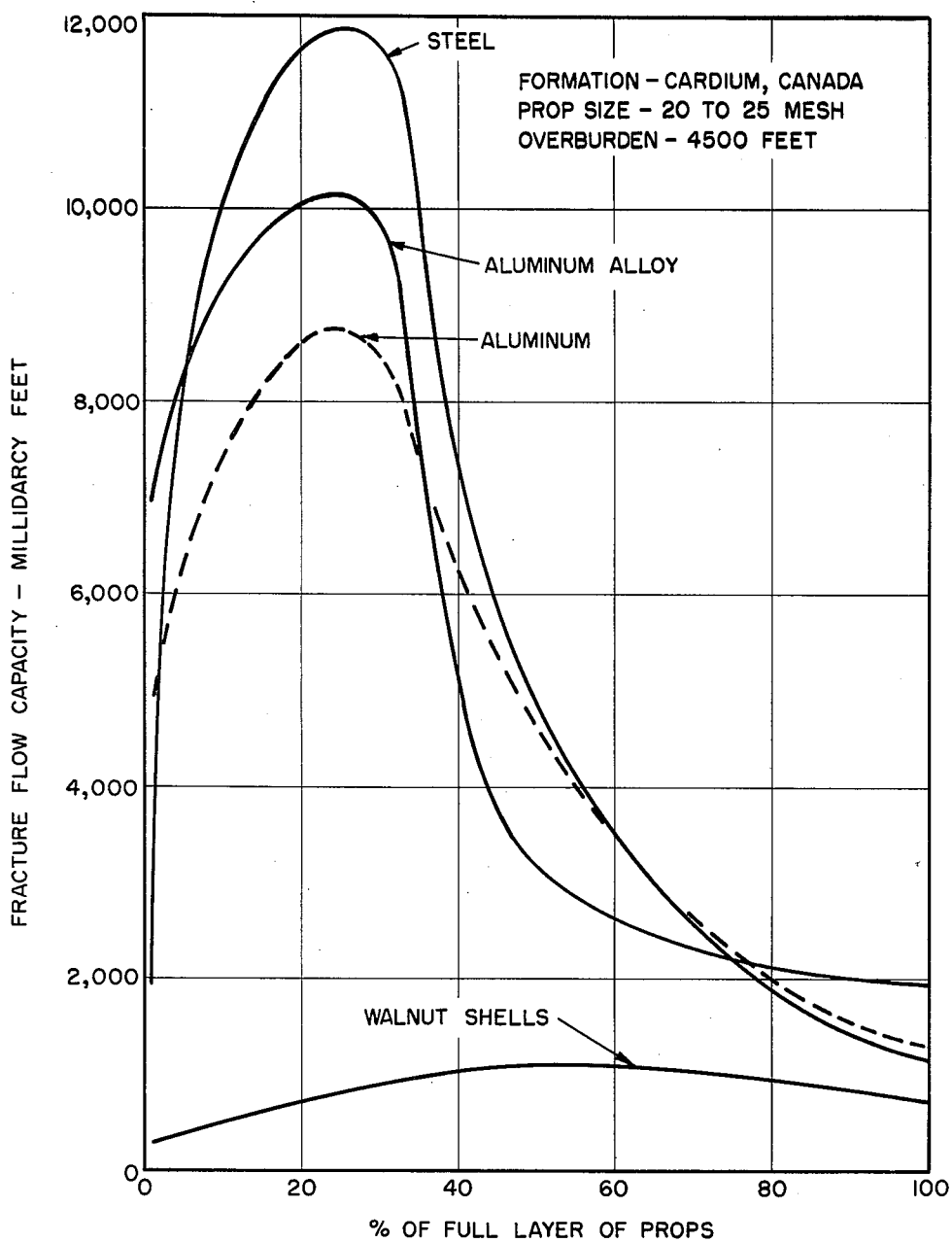

United States Patent Office 3,217,801
Patented Nov. 16, 1965

3,217,801
DILUTED MALLEABLE PROPS FOR FORMATION FRACTURES
Clarence R. Fast and George C. Howard, Tulsa, Okla., assignors to Pan American Petroleum Corporation, Tulsa, Okla., a corporation of Delaware
Filed Apr. 3, 1961, Ser. No. 100,404
18 Claims. (Cl. 166—42)

This is a continuation-in-part of our U.S. patent application Serial Number 686,882, filed September 30, 1957, now abandoned.

This invention relates to a process for increasing the productivity of wells penetrating formations which contain liquids or gas. More particularly, it relates to an improved method for increasing the flow capacities of fractures in such formations.

Obviously the productivity of any fractured formation will depend, to a large degree, on the flow capacity of the fracture. As noted in U.S. Reissue Patent 23,733, Farris, spacer materials, such as sand, crushed shell, metal, or the like, can be introduced into fractures to prop them open and increase their flow capacities. Round sand particles passing a Number 20 U.S. standard sieve and retained on a Number 40 sieve have been most widely used for this purpose. Such sand is frequently referred to as being in the 20 to 40 mesh size range. This convenient means of reference will be used occasionally hereinafter to specify particle size ranges. Spacer material concentrations as high as 5 pounds per gallon are sometimes used. As little as ½ pound per gallon is occasionally employed. The average and most common concentration seems to be about 1½ pounds per gallon. Fractures containing sand in the particle size range and concentration just described have considerably greater flow capacities than those without sand. Fractures having even greater flow capacities would obviously be desirable. Sand in various particle size ranges has been used in an effort to increase flow capacity of fractures with little success.

An object of this invention is to provide an improved method for forming fractures in formations, said fractures having high flow capacities. A more particular object is to provide an improved fracturing fluid. A still more particular object is to provide an improved propping material and method for placing it in the desired concentration in a fracture. Other objects will be apparent to those skilled in the art from the following description and examples.

In parent application 686,882, we explained that we accomplished the objects of our invention by use as propping agents of certain hard plant seed particles, such as ground black walnut shells, in a critical particle size range and in a critical concentration in the fracturing fluid. In that application we also disclosed that other strong materials, such as nylon, which would deform without shattering into separate particles could also be used. We have now found that still other strong particles, such as metals and alloys which have these same properties, can be used to even better advantage than hard plant seed particles, nylon, or the like. The general class of materials can probably best be described as being malleable. It seems best under the circumstances to present first the same description as previously with regard to the hard plant seed particles and then simply add a description of other deformable materials, together with comments on any adaptations, which might seem advisable, of the techniques suggested for handling the hard plant seed props.

In the additional comments, three figures will be helpful. These are presented in the drawing in which FIGURE I shows the effects on fracture flow capacity of dilution of fracture props using various propping materials, some of which are more easily deformed than others, to prop a fracture in a hard, strong formation. FIGURE II shows similar curves when smaller props are used in a softer formation. FIGURE III shows the effects of the degree of deformation of props on the fracture flow capacity for very high and very low concentrations of small props in a fracture in the softer formation, which is similar to those more commonly found at the depth at which most fracturing is done.

As previously noted, the Farris reissue patent teaches the use of "crushed shell" as a propping agent. This shell may be either shells of clams, oysters, or other marine shell animals, or it may be hard, strong shells or other hard portions of plant seeds. For example, black walnuts, peach seeds, coconuts, date seeds, or the like may be used. These are frequently referred to generically in the art as "shell." They will be referred to hereinafter as hard seed particles. About 2 pounds per gallon of 20 to 40 mesh hard seed particles produce a fracture having about the same flow capacity as about 2 pounds per gallon of sand in the same particle size range. Surprising results are found, however, if the size of the hard seed particles is increased to the 4 to 10 mesh range and the concentration is decreased to about $\frac{1}{20}$ to 1 pound per gallon and preferably to about $\frac{1}{10}$ to ½ pound per gallon. For example, if black walnut shells ground and sieved to this particle size range and used in this low concentration are deposited in the fracture, the flow capacity of the fracture will be very greatly increased. If, for example, sand is used in this particle size range and concentration, the fracture capacity will show only a slight increase. These results are apparent from the data in Table I appearing below.

Table I

| Propping agent | Propping agent size, U.S. sieve series mesh | Concentration of propping agent, lb./gal. | Overburden depth, feet | Average fracture capacity, millidarcyfeet |
|---|---|---|---|---|
| Ottawa sand | −16 +18 | 3 | 4,500 | 1,000 |
| Do | −20 +30 | 2 | 4,500 | 450 |
| Walnut shells | −8 +10 | ¾ | 4,500 | 12,400 |
| Do | −8 +10 | ¼ | 4,500 | 7,200 |
| Do | −14 +16 | ¾ | 4,500 | 2,200 |
| Ottawa sand | −16 +18 | 3 | 6,000 | 1,100 |
| Do | −16 +20 | 2 | 6,000 | 250 |
| Do | −20 +40 | 2 | 6,000 | 250 |
| Walnut shells | −20 +30 | 1 | 6,000 | 110 |
| Ottawa sand | −10 +12 | 5 | 7,000 | 120 |
| Do | −16 +18 | 3 | 7,000 | 120 |
| Do | −20 +30 | 3 | 7,000 | 250 |
| Do | −10 +12 | ¾ | 7,000 | 920 |
| Walnut shells | −8 +10 | 2⅔ | 7,000 | 390 |
| Do | −8 +10 | ¾ | 7,000 | 10,000 |
| Walnut shells (oil soaked) | −8 +10 | ¾ | 7,000 | 8,000 |
| Do | −8 +10 | ¼ | 7,000 | 5,000 |
| Walnut shells | −12 +14 | ¼ | 7,000 | 1,000 |
| Do | −14 +16 | ¼ | 7,000 | 800 |
| Do | −20 +30 | 1½ | 7,000 | 190 |
| Do | −20 +30 | ¼ | 7,000 | 140 |

The above data were obtained in a laboratory test where the conditions could be closely controlled and the results carefully measured. In this work a 20-ton capacity hydraulic ram was assembled so that pressure could be applied to short cylindrical core sections. The cores were from the Tensleep formation and were obtained from wells cored through this formation in Wyoming. The cores were sawed to expose smooth circular surfaces 3½ inches in diameter. The propping material under test was uniformly distributed over the surface between two of these core sections, the assembly mounted in the hydraulic ram, and the desired pressure applied. A hydraulic pump connected to the 20-ton ram automatically maintained pressure on the system.

The effective overburden pressure on the propping materials was calculated from the applied ram pressure. The equivalent well depth was determined from the effective overburden pressure previously derived from field data. The fracture capacity was calculated from data obtained by flowing nitrogen under a measured differential pressure through the fracture from a central hole drilled in the upper half of each core assembly.

The concentration of propping agent had been reported as the number of pounds of propping material per gallon of fracturing fluid in keeping with terminology used in field treatments. A propping agent concentration of one pound per gallon of fracturing fluid has been assumed, for purposes of these calculations, to be equivalent to distributing the material over the fracture surface in the ratio of one pound of propping material to 16 square feet of fracturing area assuming the fluid and propping agent are uniformly distributed within a fracture with 0.1 inch clearance.

The laboratory results obtained with sand confirm observations in the field. Neither the concentration nor the size of sand particles has much effect on the flow capacity of a fracture. The explanation seems to lie in the tendency of a sand particle to shatter into many small particles when too much overburden weight is placed on it. If insufficient sand particles are present in a fracture, the particles shatter to produce smaller fragments. Eventually, sufficient large particles are shattered to produce enough smaller particles to support the load. Unfortunately, when a large particle shatters, smaller particles are produced having a large range of sizes. When flow occurs through a fracture propped with shattered sand particles, only the larger particles are held immobile between the faces of the fracture. The smaller particles move into the spaces between the larger ones and eventually build up a bridge which greatly restricts flow.

Even when enough sand grains are present theoretically to support the overburden pressure without crushing, still the few largest particles which the fracture faces first contact will almost always crush and shatter, producing finely divided particles, many of which fit into openings between the sand grains to inhibit flow.

When the concentration of sand is about 2 pounds per gallon of fracture volume and the sand is in the 20 to 30 mesh size range, the particles can form a single layer with the sand grains very close together. In this arrangement there is little space between the sand grains for flow of fluids. This space is further restricted by small particles resulting from shattering of the largest grains. Thus, when 2 pounds of sand in the 20 to 30 mesh size range are used per gallon of fracture volume, enough particles are provided to support about 7,000 feet of overburden. However, the permeability of the fracture is low because the larger grains are crushed and all the grains are crowded closely together. If a lower concentration of sand is used to provide more space between sand grains, an insufficient number of particles is present to support the ove-burden weight and even more of the sand grains are crushed. This permits the fracture to close to a narrow width as well as filling the fracture with particles having a very widely distributed particle size range and hence a relatively low permeability.

If the same weight of sand is used, but having larger average particle size, the number of particles is smaller. Therefore, because each particles must support more weight, the larger particles crush, permitting the fracture to close and filling the fracture with particles having a wide particle size distribution. The result may be even worse than if smaller particles of a more uniform particle size are used in the beginning.

From the data in Table I it is apparent that hard seed partcles do not behave in the same way as sand. The explanation lies in the ability of a hard plant seed particle to crush without shattering into many small individual pieces. When a walnut shell particle is squeezed between stone blocks, the particle deforms without shattering. It simply flattens out until the area of the flattened particle is sufficient to bear the load imposed upon it. If sufficient particles are used in a fracture so the particles are very close together, little space remains for flow of fluids whether the particles are large or small. This is particularly true if some deformation occurs to cause the particles to fill part of the spaces between them. Even if deformation occurs, there is no shattering as with sand. This probably explains why flow capacities of fractures filled with large nut shells are higher than flow capacities of fractures filled with sand to the same degree. Some strong plastics such as nylon also seem to have this property of deforming without shattering and have been found to produce high-capacity fractures.

If a low concentration of large particles is used, these particles simply flatten out to form pillars on which the formation is supported, leaving relatively large clear flow channels between the pillars. Laboratory observation of the particles after testing substantiates this theory. It is true that the same action takes place if a very low concentration of small particles is used, but in this case the small particles upon deforming allow the fracture to close to such a narrow width that the flow capacity is low. Whatever the explanation, the data show clearly the superiority of a low concentration of large particles of the hard portions of plant seeds.

Several satisfactory hard seed materials have been previously mentioned. Many seeds, however, are so soft that even the hardest portions are not satisfactory. These include materials such as peanut hulls, watermelon seeds, grape seeds, orange seeds, and the like. If such materials are ground and deposited in fractures, they do not shatter when the overburden pressure is applied to them, but they are so weak that they flatten out into very thin layers, allowing the fracture to close almost completely. It will be apparent that a minimum compressive strength must be possessed by a hard plant seed particle if it is to prop a fracture open so flow of fluids between propping particles can occur. Hard seed materials to be satisfactory as fracture props should have a compressive strength of at least about 5,000 p.s.i. and preferably at least about 10,000 p.s.i.

Another requirement of the hard seed particles is the particle shape. Flat plates or long fibers in the 4 to 10 mesh size range will be of little value as propping agents. If they are deposited with the long dimension along the fracture, the fracture can close almost completely. If deposited with a long dimension propping the fracture open, the particles crush much too readily to act as good props. The shape must be what generally called granular. Preferably, it should be spherical or nearly so. For our purposes, the term "granular particle" will be used to mean a particle having a minimum dimension at least one-half that of the maximum dimension. If the large dimension is such as to be retained on a Number 10 sieve, 0.079 inch, the minimum dimension must be at least about 0.04 inch for our purposes. This excludes many hard plant seed materials, such as acorn shells, cottonseed hulls, and even almond shells, while a few hard shell materials, such a prune seeds, English walnut shells, pecan shells, and cherry pits, barely fulfill the requirement. The thicker shells, such as black walnut shells, hickory nut shells, peach pits, and coconut shells, are preferred for forming even the smaller particles and are required for forming the larger particles which barely pass a Number 4 sieve, 0.187 inch maximum dimension, 0.09 inch minimum dimension. Table II presents compressive strength and shell thickness for a number of hard seed materials. Others, such as butternut shells, Brazil nut covers, date pits, and the like, will occur to those skilled in the art. Their suitability for our purposes can be determined by measuring compressive strength and shell thickness. So far as we are aware, all hard plant seed materials have the necessary property of crushing without shattering.

Table II

| Material | Compressive strength, p.s.i. | Average thickness, in. |
| --- | --- | --- |
| Black walnut shells | 20,000+ | 0.20 |
| Pecan shells | 5,000+ | 0.05 |
| Coconut shells | 5,000+ | 0.10 |
| Peach pits | 20,000+ | 0.15-0.25 |
| Brazil nut covers | | |
| Cherry pits | 5,000+ | 0.05 |
| Apricot pits | 5,000+ | 0.08 |
| Hickory nut shells | 20,000+ | 0.20 |
| English walnut shells | 5,000+ | 0.04 |
| Plum pits | 5,000+ | 0.06 |
| Olive seeds | 5,000+ | 0.06 |
| Prune seeds | 5,000+ | 0.04 |
| Grape seeds | | 0.02 |
| Almond shells | 5,000+ | 0.03 |
| Peanut hulls | | 0.03 |
| Cottonseed hulls | | <0.02 |
| Acorn shells | 5,000+ | 0.02 |
| Orange seeds | | <0.02 |
| Grapefruit seeds | | <0.02 |
| Lemon seeds | | <0.02 |
| Watermelon seeds | | <0.02 |

Several of the materials listed, such as grape seeds, cottonseeds, orange seeds, and watermelon seeds, may appear to be quite hard, but when cracked open they will be found to be made up of a relatively soft interior pulp. The average thickness figures are, of course for the outer hard shells or coatings and not for the seeds themselves.

The superiority of our hard seed particles seems to depend, in part at least, on the formation of pillars separated by large flow channels. Substantially identical results can be obtained by separating the particles from one another or by gathering the particles in groups leaving large unobstructed paths between the groups. The type of spacing depends, to some extent, on the method of placing the particles in the formation.

Before describing the process by which best advantage can be taken of our discovery, it should first be noted that, even if high concentrations of large nutshell particles are used, the flow capacity of a fracture will be somewhat greater than normally obtainable with sand. Therefore, if, intentionally of otherwise, a high concentration of large nutshell particles is deposited in a fracture, some improvement will be gained over the prior art. Thus, the normal process for hydraulic fracturing of formations penetrated by wells and depositing fracture props therein may be used, and some advantage will be obtained by use of large hard seed particles as props.

To insure proper spacing of individual hard seed particles, these particles may be mixed with particles of an oil-soluble material, such as naphthalene, paradichlorobenzene, hexachlorocyclohexane, or the like. For best results, the volume of oil-soluble particles should be about two to four times the volume of the hard seed particles. As previously noted, however, the hard seed particles can be used without dilution by oil-soluble solid particles. Thus, the concentration of the oil-soluble particles may be zero. To obtain an appreciable effect, the volume of soluble particles should be at least about 1/10 that of the hard seed particles. Any concentration less than this should be regarded as substantially zero. The volume of oil-soluble particles should not exceed about 10 times the volume of hard seed particles except in very shallow wells, up to about 1,000 feet deep for example, to avoid excessive flattening of the few hard seed particles with consequent great decrease in fracture width. The oil-soluble particles perform their function by spacing the hard seed particles apart during placement in the fracture after which the oil dissolves the oil-soluble material, leaving free flow channels between the pillars formed by deformation of the large individual hard seed particles.

Preferably, the particles of oil-soluble material should be about the same size as the hard seed particles. They should be little, if any, larger to avoid difficulties in placing the propping materials in the fracture. The particles of oil-soluble material should not be less than about one-half the size of the hard seed particles to insure rapid flow of fracturing fluid through bridges of the mixed particles over the face of the fracture at the well wall or through the fracture itself when filled with the mixed particles. This is particularly important during the fracturing process, as explained later in more detail.

The degree of oil solubility of the diluent solid is not particularly critical, once it is in place in the fracture. The oil-soluble particles may dissolve slowly from the fracture with no great disadvantage to the method. It is preferred, however, that the oil-soluble material be soluble to the extent of between about 1 and about 50 grams of solid in 100 milliliters of formation oil at the conditions of temperature and pressure present in the formation. Since the particle size distribution is so critical, however, it may be advisable to use a very slowly oil-soluble material, such as hexachlorocyclohexane or some of the synthetic resins manufactured from coumarone, indene, dicyclopentadiene, or the like. If highly oil-soluble materials, such as naphthalene, are used, the particles should be very large when introduced into the well so they will not become too small in their travel to the bottom of the well. Preferably, in any case, the carrying liquid should be saturated with the temporary diluting solids to prevent change in size of particles of these materials as they travel down the well.

The particles of diluent material have been described as oil-soluble since the hydraulic fracturing process is used mostly for fracturing oil-bearing formations. If a water-bearing zone is to be fractured to increase the productivity of a water well, the diluting particles should be of a water-soluble material, such as sodium chloride. If a gas-producing zone is to be fractured, the diluting particles should be of a slightly volatile solid, such as naphthalene. Generically speaking, the propping agent should consist essentially of hard seed particles plus particles of a temporary diluting material having a melting point greater than the temperature of the formation to be fractured.

If sufficient particles of the temporary diluting material are used with the hard seed particles, the concentration of the mixture in the fracturing liquid is not critical since the diluting particles insure proper spacing of the hard seed particles in the fracture. Thus, the concentration of mixed particles may be as much as 2 or 3 pounds per gallon of fracturing liquid. Preferably, however, the concentration should not exceed about 1 pound per gallon.

If no particles of temporary diluting material are used, however, the concentration of hard seed particles should not exceed about 1 pound per gallon and preferably should be not more than about 1/2 pound per gallon of fracturing liquid. If a concentration of 1/2 pound per gallon was used and no leakage of fracturing liquid away from the hard seed particles occurred, the resulting concentration of hard seed particles in the fracture would be 1/2 pound per gallon of fracture volume. Actually, of course, considerable leakage to the formation adjacent to the fracture occurs. Because of this leakage of liquid away from the hard seed particles, the initial 1/2 pound per gallon concentration of the hard seed particles in the fracturing liquid is the minimum which will be present in the fracture. The concentration in the fracture itself is normally much higher except for the very last fracturing fluid injected into the fracture due to the shorter time that the fracturing liquid is in contact with the formation. To overcome this phenomenon the concentration of hard seed particles in this last material may sometimes be increased to as high as 1 pound per gallon of fracturing liquid.

The minimum concentration of hard seed particles, if undiluted by particles of temporary diluting material, should be at least about 1/20 pound per gallon of fracturing liquid. Even smaller concentrations will deposit adequate particles to support the overburden in many shallow wells. However, the increased flow capacity of the fracture usually is not sufficient to justify the risk of depositing so few hard seed particles that they will be flattened excessively with consequent closing of the fracture and decreased flow capacity.

Many of the effects of low concentrations of hard seed particles can be obtained and with more certainty by using batches of fracturing fluid free from propping agents, these batches being interspersed with other batches containing high concentrations of the hard seed particles. For example, as much as 2 or 3 pounds per gallon may be used. As a batch of liquid containing hard seed particles enters a fracture, it flows away from the well, carrying the particles with it. These particles tend to drag on the bottom of the fracture, however, much like sand drags on the bottom of a river. Also, like sand in the river, the particles tend to gather together in groups just as sand bars form in the river. The following batch of particle-free fracturing fluid then sweeps these groups or bars of particles farther back into the fracture while establishing clear channels between the bars just as water in a river establishes channels between the sand bars in the river.

Preferably, the initial batch of fracturing fluid should contain no propping agent. This avoids the danger of building up an excessively large bridge of particles over the face of the fracture at the well wall before the fracture is widened enough to permit flow of the particles into the fracture. For the same reason, such a batch of particle-free liquid should be used, even if the hard seed particles are not to be introduced in batches interspersed with particle-free fracturing fluid. If a fairly high concentration of hard seed particles is used in the last batch of fracturing fluid containing these particles, this batch should be followed by a final batch of fracturing fluid containing no particles. This is to be sure that channels are established through the hard seed particles near the well. The final batch of liquid may sweep the fracture near the well clear of particles altogether. If sufficient particles are present in the fracture a few inches from the well, no further support of the fracture near the well will be required. To be certain that the fracture does not tend to close at the well face, however, it may be advisable to use as the final batch of fracturing fluid one containing a low concentration of from about $1/20$ to $1/4$ pound of hard seed particles per gallon of fracturing fluid.

The concentration of hard seed particles in the batches of fracturing fluid containing these particles will depend upon the ratio of volumes of fracturing fluid with and without particles. The previously recommended concentration of from $1/20$ to 1 pound per gallon should be multiplied by the ratio of the total volume of fracturing fluid to the volume of the batch of fluid containing particles. For example, if the batches of particle-free fluid are twice the size of those containing hard seed particles, the concentration of hard seed particles in batches containing these particles should be about $3/20$ to 3 pounds per gallon. The batches of particle-free fracturing fluid should range from about zero, if no particle-free fluid is used, to as much as four or five times as large as the batches of fluid containing hard seed particles.

Another special technique is to taper the size of particles injected. A fracture is tapered from a very small fraction of an inch at its outer extremity to as much as $1/2$ inch or more near the well where high pressures are present to lift, compress, or deform the overburden. Large hard seed particles will not, of course, enter the portion of the fracture near its outer extremity away from the well. This portion of the fracture should be propped by smaller hard seed particles. Since these smaller hard seed particles provide little more fracture flow capacity than sand, sand particles may be used to prop the fracture near its outer edge. That is, the first props injected may be sand or small hard seed particles whether the props are injected continuously or in batches. The final propping particles injected should be the large hard seed particles in low concentration as previously described. The size of particles injected may be tapered continuously, if desired, from smallest to largest or the increase in size may be stepwise. In either case, a tapered prop is provided to fit the tapered fracture. Another advantage of injecting small props first is that they penetrate far back away from the well where flow velocities may be too small to carry larger particles through the fracture and away from the well.

The concentration of propping particles may also be tapered. More liquid is lot from the first fracturing composition injected as it flows through the entire fracture than is lost from the last of the composition which barely enters the fracture. Therefore, to obtain a reasonably uniform concentration of particles in the fracture, the concentration of particles in the first liquid injected should be less than that in the last to be injected. Preferably, the first liquid should contain little more than the minimum of $1/20$ pound of hard seed particles per gallon of liquid if such particles are used at all. The last liquid injected should contain near the maximum of $1/2$ to 1 pound per gallon.

As previously noted, the concentration of hard seed particles in the fracture is very important. Leakage of the liquid component of the fracturing composition to the formation changes the concentration of the particles in the fracturing liquid and hence the concentration in the fracture. Therefore, better control of concentration of particles can be obtained by limiting the leakage of fracturing liquid to the formation. This can be done by pumping rapidly to provide as little time as possible for leakage to occur. Control can also be improved by using a fracturing liquid having as low a penetrating rate into the formation pores as possible. Several suitable means for decreasing the rate of penetration of fracturing liquid into the pores of the formation are described in Farris Reissue Patent No. 23,733. When the term "low penetrating liquid" is used hereinafter, the term as defined in the Farris patent is intended.

If a vertical fracture is preferred, rapid pumping of a low-penetrating carrying liquid from the beginning is considered advisable. If a horizontal fracture is desired, however, the first fracturing liquid should have a higher penetrating ability and should be pumped more slowly until the fracture is initiated. The low-penetrating liquid can then be used to carry the hard seed particles into the fracture at a high pump rate.

Although low-penetrating carrying liquids for the hard seed particles are preferred for most purposes, almost any mineral oil, water, or mixtures of oil and water can be used as carrying liquids if desired. The term "mineral oil" is intended in its broad sense to include crude petroleum and fractions thereof. The mineral oil, water, or mixtures of the two, may be used without additives or may contain materials in solution or suspension. For example, water may be fresh or salty and may contain colloidal solids, such as starch, to decrease the loss of the water to the formation. The mineral oil may be, for example, kerosene or diesel fuel as they come from the stills, or it may contain materials such as naphthalene in solution or colloidal solids, such as heavy metal soaps.

One fracturing method requires special consideration. This is the method of forming multiple fractures in which, after one fracture is initiated, extended to the desired degree, and propped open, a temporary bridging and sealing agent is introduced to bridge and seal the first fracture so a second fracture can be formed. The process is generally described in U.S. Patent 2,734,861, Scott et al. In this process the first fracture is sealed by injecting into the well a liquid containing an oil-soluble material ground to form particles ranging from 4 to 100 mesh size. These particles form a seal in the fracture or over the face of the fracture in the well. When the seal is formed, no further liquid can enter the fracture. The hydraulic forces holding the fracture open are thereupon released by leakage of the liquid into the pores of the formation. Upon release of the hydraulic forces, the fracture closes upon the propping agent in the fracture. Since the seal of oil-soluble material prevents further entry of fracturing liquid into the fracture, the fracturing liquid can then be pumped into the well at a rate sufficient to cause the formation of a second fracture.

An improvement of the composition for forming the seal over the first fracture is taught and claimed in U.S. Patent 2,873,250. In this improved composition the strength of the bridge and seal is improved by substituting 4 to 10 mesh particles of a hardy woody material, such as ground black walnut shells, for the 4 to 10 mesh particles of the relatively much weaker oil-soluble materials taught in U.S. 2,734,861, Scott et al. The stronger particles form a strong bridge over which the oil-soluble particles in the 10 to 100 mesh range can form a seal. It will be noted that the composition described in U.S. 2,873,250, Scott, is similar to one embodiment described by us; that is, it may consist of a carrying liquid, hard seed particles, and particles of an oil-soluble material. The composition described in U.S. 2,873,250, Scott, forms a seal in or over a fracture so no further liquid or particles can enter. Our composition, on the other hand, enters the fracture and does not seal it to further flow. The difference in composition which accounts for this difference in action should be carefully noted.

The composition which forms a seal and prevents further entry of liquids into the formation has particles distributed throughout the range from 4 to 100 mesh size. In this composition the larger particles bridge in or over the fracture. The particles of intermediate size bridge the openings between the larger particles, and the smaller particles form a seal over the bridge of large and intermediate particles substantially completely stopping the flow of liquid into the fracture. As previously explained, collapse of the fracture on its propping agents results.

Our composition, on the other hand, contains no small particles in the range from about 20 to 100 mesh size. The oil-soluble material may contain particles somewhat smaller than the hard seed particles, but not much smaller. As previously noted, the oil-soluble particles should not be much smaller than one-half the size of the hard seed particles. When this limitation is observed, there are no particles of intermediate or small size to bridge and seal the openings between the large particles. Therefore, flow of liquid between these particles can and does continue, expanding the fracture until the large particles can enter and move back away from the well in the fracture.

After a first fracture is formed and propped with our hard seed particles, this fracture can be sealed by introducing the composition taught in U.S. 2,734,861, Scott et al or in U.S. 2,873,250, Scott. The particles having wide distribution of particle sizes form a bridge and seal in or over this fracture, permitting a second fracture to be formed. The extremely critical nature of the particle size distribution will be apparent from the above description. If the concentration of large hard seed particles in the fracture is fairly high, no particles in the 4 to 10 mesh size range need be included in the sealing composition. Since a low concentration of large hard seed particles in the fracture is more likely, however, it is generally best to include 4 to 10 mesh particles in the composition used to seal the fracture.

Another composition used to seal fractures is drilling fluids containing ground hard nutshells. Although these compositions are not particularly suitable for multiple fracturing operations, they are mentioned here since again a carrying liquid containing ground hard seed particles does not enter a fracture, but seals it. Again, it is to be noted that the operability of the nutshells in drilling fluids depends upon the presence of a gradation of particle sizes from the largest down to particles which are barely retained on a Number 80 U.S. standard sieve. The small particles have been proved to be necessary to form a base over which the colloidal particles in the drilling fluid can form a seal. In this connection, it should be noted that, so long as a gradation of particles from 4 mesh to 80 to 100 mesh in size are not present, colloidal particles flow readily through the pores of beds of granular materials. Even particles much larger than the colloidal range flow readily through such beds. The particles used in forming low-penetrating carrying liquids should not, however, contain more than a percent or two of particles which will not pass a Number 325 U.S. standard sieve. The term "substantially free from particles retained on a Number 325 U.S. standard sieve" should be interpreted to mean that the composition contains not more than 1 or 2 percent of particles retained on such a sieve. The term "consisting essentially of," when used in connection with a fracturing fluid, is intended to indicate the named ingredients plus minor amounts of other materials, such as dissolved salts and colloidal particles, which do not substantially adversely affect the properties of the fracturing fluid or its ability to initiate and extend fractures, but to exclude substantial amounts of materials, such as solid particles in the 20 to 325 mesh range, which would cause the fracture to become sealed or otherwise adversely affect the fracturing operation to a substantial degree. Sand, which would shatter and produce particles in this range, is also excluded. When particles are described as "being substantially in the size range passing one sieve and being retained on another," the term is intended to indicate that not more than about 5 percent by weight of the particles are retained on the larger screen and not more than about 5 percent by weight pass the smaller screen.

In multiple fracturing operations after a fracture has been formed and a propping agent has been introduced, the sealing of the fracture can be improved by stopping pumping of liquid into the well to permit the fracture to collapse as far as it will on its props before the fracture sealing composition reaches the fracture. The sealing composition should then be pumped slowly into and against the fracture to avoid any possibility of expanding the fracture again before a good seal is formed in and over the fracture. After the seal has been formed, pumping at a high rate can be resumed to initiate and expand another fracture.

In any of the methods described above, the volumes of fracturing fluids employed may be any of those conventionally used in fracturing operations. For example, they may vary between small jobs requiring only a few hundred gallons to very large jobs employing 100,000 gallons or more. Volumes in the range of about 5,000 to 50,000 gallons are recommended for most purposes.

The effects of diluting, or otherwise spacing apart, other deformable props such as aluminum, aluminum alloy and steel, are best seen in FIGURES I and II of the drawing. In obtaining these data, the equipment and procedure used were those described immediately following Table I. In FIGURE I, the props were in the 14 to 16-mesh range. The formation was the Tensleep sand, the samples being obtained by coring operations through this formation in wells in Wyoming The pressure imposed was equivalent to 7,000 feet of overburden.

The effect of diluting walnut shells is shown by the bottom curve of FIGURE I. The values are, in general, somewhat higher than those given in Table I, principally because the data in FIGURE I were obtained in short-term tests which did not allow sufficient time for the nutshell props to be deformed to an extent where they would support the entire overburden load. The values in Table I were obtained after waiting several days for a condition to be established more nearly approaching equilibrium. The metal props seem to reach a state approaching equilibrium somewhat more quickly than the nutshells. Therefore, the short-term tests seemed appropriate for these materials. The short-term tests with walnut shells were run simply for purposes of comparison to the metal props.

The effects of diluting or otherwise spacing props of aluminum, aluminum alloy and steel are shown in the upper three curves of FIGURE I. In all cases it is apparent that at least about 50 percent of the malleable props should be replaced by temporary diluting particles if the principal advantages of the dilution technique are to be obtained. From FIGURE I it appears that even with a formation as hard and strong as the Tensleep formation the concentration of temporary diluting particles should not exceed about 9 or 10 times that of the permanent deformable props. The criticality of this minimum concentration becomes more apparent in FIGURE II where the much softer and weaker Cardium formation was used and the size of the propping agent was small, being in the 20 to 25-mesh range. The samples of the Cardium formation were obtained as cores from wells in the Pembina Field in Alberta, Canada. It is apparent that even if the aluminum alloy is used with such formations, the concentration should not be less than about $\frac{1}{10}$ that of the spacer particles. With steel and walnut shell props in the Cardium, the temporary diluting particles should not exceed about 4 or 5 times the volume of the props.

The data on walnut shells in FIGURE II are quite discouraging and confirm again the failure of the smaller walnut props to produce high fracture flow capacities whether diluted or not.

Performances of aluminum, aluminum alloy and steel props diluted to different degrees with removable diluents, or otherwise deposited in the low concentrations indicated, are shown in the top three curves of FIGURE II for the softer and weaker Cardium formation. It is apparent that with a full layer of deformable props the alloy is better than either the aluminum or steel. At 50 percent concentration, the aluminum and steel are both somewhat better than the alloy. At 25 percent concentration, the alloy is intermediate between the aluminum and steel, while at 10 percent concentration the alloy is again greatly superior to both the aluminum and steel. The explanation of these results is believed to be as follows:

When the weight of the overburden is applied to the props in the fracture, two types of deformation take place. One is the flattening of the malleable props. This has been previously described. The other is imbedding of the props into the formation. In the process of imbedding the props chip out small pieces of the formation. These pieces tend to wedge between the props and decrease flow of fluids. Considering now the actions of the props of aluminum, aluminum alloy and steel, the aluminum deforms most, the alloy to a smaller degree, and the steel very little. Since the aluminum deforms readily to form large, flat pillars to support the formation, it does not become seriously imbedded in even the relatively soft Cardium formation. The alloy deforms some, so does not become seriously imbedded in the formation, but neither does it become seriously deformed. The steel deforms very little. The small, substantially spherical, steel props penetrate the formation easily if the formation is somewhat weak or soft, creating many small chips.

If a full layer of props is used in the fracture, the aluminum deforms considerably and, since the particles are already in contact, the deformation tends to fill in the spaces between the props and thus decreases the sizes of the flow paths. The steel props become imbedded in the formation. Since the props in a full layer touch each other, the formation chips are easily trapped between the props, filling the flow paths and decreasing the flow capacity of the fracture. These chips have been observed in tests using steel props. The alloy props neither deform enough to seriously close the flow paths, nor do they penetrate the formation enough to cause trouble. Therefore, the flow capacity of a fracture containing a full layer of alloy props is greater than that of fractures containing full layers of aluminum or steel props.

When the number of props is only one half enough to form a full layer in the fracture, the situation is different. The alloy props deform somewhat and also become imbedded to some degree in the formation. The aluminum deforms but does not become imbedded to an appreciable extent, while the steel becomes imbedded but deforms vary little. At this concentration of props, however, there are spaces between the aluminum props even after they have become greatly deformed. The flow capacity, therefore, is not greatly impaired. Large spaces also exist between the steel props so the formations chips can escape, or if they become wedged between props, they do not greatly restrict the flow paths. Enough props are available to prevent excessive imbedding of the steel or deformation of the aluminum. Therefore, the aluminum which does not imbed and the steel which does not deform produce better results than the alloy which both imbeds and deforms. The difference, however, is not great.

At a concentration of one fourth of a full layer of props, FIGURE II shows that the deformation of the aluminum is sufficient to allow the fracture to close more than it does with the aluminum alloy, even though the alloy is imbedded in the formation to some extent. The steel shot, although imbedded deeply into the soft Cardium formation, is still so strong that it holds the fracture open farther than either the aluminum or alloy.

When the concentration is reduced to one-tenth a full layer, the steel props become almost completely buried in the formation and a low fracture flow capacity results. The aluminum props do better than the steel, but here the flattening of the props becomes so extreme that the fracture flow capacity is reduced considerably below that for one fourth of a full layer. The flow capacity of the alloy-propped fracture is also lower at a prop concentration of one-tenth a full layer than at a concentration of one-fourth a full layer. With the alloy, however, neither the deformation of the props nor the imbedding in the formation are extreme, so the fracture flow capacity is considerably greater than with aluminum or steel props.

The superiority of the alloy over both the aluminum and steel at either full layer or one tenth layer concentration is shown more clearly in FIGURE III. In this figure, the flow capacity of the fracture is plotted against the deformability of the props. This deformability is in terms of a factor which is more accurately defined later. In FIGURE III, the positions of walnut shell, aluminum, aluminum alloy and steel are shown. The superiority of a propping agent having an intermediate deformability in the range of the aluminum alloy is apparent when a fracture in the soft Cardium formation is propped by either high or low concentrations of 20 to 25-mesh deformable props.

These results shown in the figures have been discussed in some detail since they form the bases of several limitations on our methods and compositions. In defining the methods and compositions and in setting limits, seven variables must be considered. These are as follows:

(1) Deformability of props
(2) Sizes of props
(3) Distribution of sizes of propping particles
(4) Concentration of props in the fracture
(5) Hardness of formation
(6) Overburden pressure
(7) Length of time deformable props have been in fracture.

Before considering these variables separately, it will be helpful to present the full data from which the curves in FIGURES I and II are selected. The complete data from which the curves of FIGURE I were taken are presented in Table III.

Table III

| Overburden, feet | Concentration, monolayer fraction | Fracture flow capacity, md.-ft. for various props | | | |
|---|---|---|---|---|---|
| | | Walnut shell | Aluminum | 6% silicon aluminum | Steel |
| 1,750 | Full | 3,370 | 7,820 | 8,285 | 9,745 |
| 4,500 | do | 1,615 | 5,660 | 6,180 | 8,285 |
| 7,000 | do | 745 | 4,335 | 5,010 | 7,820 |
| 9,400 | do | 300 | 3,225 | 4,355 | 7,500 |
| 11,600 | do | 185 | 2,230 | 3,785 | 6,980 |
| 1,750 | ½ | 6,675 | 20,285 | 16,650 | 24,130 |
| 4,500 | ½ | 3,785 | 17,255 | 13,715 | 22,095 |
| 7,000 | ½ | 1,915 | 10,170 | 11,765 | 21,205 |
| 9,400 | ½ | 1,250 | 5,945 | 9,745 | 20,285 |
| 11,600 | ½ | 770 | 3,785 | 7,820 | 20,285 |
| 1,750 | ¼ | 27,200 | 52,045 | 92,305 | 84,200 |
| 4,500 | ¼ | 12,720 | 26,540 | 51,665 | 70,585 |
| 7,000 | ¼ | 7,070 | 16,020 | 35,945 | 63,720 |
| 9,400 | ¼ | 5,220 | 10,725 | 27,755 | 63,720 |
| 11,600 | ¼ | 3,785 | 7,820 | 19,065 | 58,900 |
| 1,750 | ⅒ | 19,990 | 77,265 | 100,040 | 187,865 |
| 4,500 | ⅒ | 8,100 | 38,065 | 70,585 | 159,895 |
| 7,000 | ⅒ | 3,970 | 16,545 | 30,870 | 159,895 |
| 9,400 | ⅒ | 2,725 | 11,135 | 19,625 | 106,665 |
| 11,600 | ⅒ | 1,765 | 6,980 | 13,875 | 74,945 |

These data on large 14 to 16-mesh props in the very hard and strong Tensleep formation show several things. If it can be determined with certainty that the formation is as hard and strong as the Tensleep formation, and if the well is deep so that the overburden will be heavy, the props should be as strong as possible and should be used in low concentration. If the deformability is about that of the alloy, the concentration in the fracture should be about ¼ a full layer. If stronger props approaching the low deformability of steel are used, a concentration as low as about ⅒ a full layer should be provided. At shallow depths the concentrations of the easily deformable props should be decreased. At depths up to about 7,000 feet, for example, prop concentration as low as about ⅒ a full layer may be provided.

When the large 14 to 16-mesh props were used with the Cardium formation, the results presented in Table IV were obtained.

Table IV

| Overburden, feet | Concentration, monolayer fraction | Fracture flow capacity, md.-ft. for various props | | | |
|---|---|---|---|---|---|
| | | Walnut shell | Aluminum | 6% silicon aluminum | Steel |
| 1,750 | Full | 3,865 | 10,320 | 7,755 | 7,400 |
| 4,500 | do | 1,870 | 9,515 | 5,640 | 6,135 |
| 7,000 | do | 1,050 | 4,650 | 4,280 | 4,815 |
| 9,400 | do | 690 | 3,230 | 3,599 | 3,890 |
| 1,750 | ½ | 8,515 | 25,865 | 21,680 | 25,865 |
| 4,500 | ½ | 4,260 | 18,485 | 17,470 | 20,070 |
| 7,000 | ½ | 2,975 | 12,375 | 15,625 | 15,755 |
| 9,400 | ½ | 1,870 | 8,195 | 12,485 | 7,600 |
| 1,750 | ¼ | 20,215 | 63,000 | 63,000 | 48,915 |
| 4,500 | ¼ | 8,800 | 36,775 | 48,240 | 21,680 |
| 7,000 | ¼ | 4,260 | 18,485 | 33,305 | 7,430 |
| 9,400 | ¼ | 1,800 | 12,590 | 22,690 | 2,405 |
| 1,750 | ⅒ | 8,515 | 74,115 | 116,840 | 41,890 |
| 4,500 | ⅒ | 2,330 | 21,835 | 39,675 | 2,945 |
| 7,000 | ⅒ | 690 | 10,960 | 17,660 | 645 |
| 9,400 | ⅒ | 435 | 5,515 | 4,400 | 145 |

The most outstanding point to be noted in these data is the remarkably poor results of using low concentrations of the large steel props at even moderate depths such as 4500 feet. Both aluminum and the alloy provided very good results, even with rather large overburden loads when the prop concentration was only ⅒ of a full layer. Apparently, both these materials deformed sufficiently to form broad pillars which adequately supported the rather weak formation. The steel props, on the other hand, failed miserably when used in the low concentrations which in the Tensleep formation had produced the best results. The explanation appears to be that the small number of large steel balls were not enough to support the formation which simply closed down around the balls permitting the fracture to close. Even a concentration of ¼ of a full layer of large steel props was much less effective than the same concentration of aluminum alloy props at 7,000 overburden, for example.

The full data from which FIGURE II was plotted is presented in Table V. In this test, props in the 20 to 25-mesh range were used with the Cardium formation.

Table V

| Overburden, feet | Concentration, monolayer fraction | Fracture flow capacity, md.-ft. for various props | | | |
|---|---|---|---|---|---|
| | | Walnut shell | Aluminum | 6% silicon aluminum | Steel |
| 1,750 | Full | 1,300 | 1,975 | 2,705 | 1,460 |
| 4,500 | do | 730 | 1,300 | 1,955 | 1,125 |
| 7,000 | do | 475 | 1,040 | 1,530 | 995 |
| 9,400 | do | 335 | 795 | 1,255 | 735 |
| 1,750 | ½ | 2,095 | 5,855 | 4,315 | 5,750 |
| 4,500 | ½ | 1,090 | 4,750 | 3,170 | 4,890 |
| 7,000 | ½ | 625 | 3,505 | 2,540 | 4,210 |
| 9,400 | ½ | 435 | 2,470 | 1,960 | 3,585 |
| 1,750 | ¼ | 2,975 | 13,540 | 13,540 | 14,570 |
| 4,500 | ¼ | 755 | 8,770 | 10,140 | 11,875 |
| 7,000 | ¼ | 370 | 5,325 | 7,325 | 8,810 |
| 9,400 | ¼ | 340 | 3,170 | 4,885 | 4,125 |
| 1,750 | ⅒ | 690 | 12,875 | 14,480 | 12,205 |
| 4,500 | ⅒ | 315 | 4,880 | 6,955 | 1,955 |
| 7,000 | ⅒ | 275 | 2,110 | 3,375 | 610 |
| 9,400 | ⅒ | 230 | 1,100 | 1,390 | 160 |

The outstanding features of these data are explained in connection with the explanation of FIGURE II.

Table VI presents data obtained with the small 20 to 25-mesh props and the Tensleep formation.

Table VI

| Overburden, feet | Concentration, monolayer fraction | Fracture flow capacity, md.-ft. for various props | | | |
|---|---|---|---|---|---|
| | | Walnut shell | Aluminum | 6% silicon aluminum | Steel |
| 1,750 | Full | 1,220 | 1,545 | 3,025 | 3,205 |
| 4,500 | do | 620 | 1,100 | 2,295 | 2,460 |
| 7,000 | do | 255 | 850 | 1,820 | 2,295 |
| 9,400 | do | 115 | 675 | 1,356 | 1,975 |
| 1,750 | ½ | 2,320 | 7,085 | 6,765 | 8,665 |
| 4,500 | ½ | 950 | 5,415 | 5,315 | 7,995 |
| 7,000 | ½ | 365 | 3,845 | 4,050 | 7,320 |
| 9,400 | ½ | 270 | 2,475 | 3,130 | 7,085 |
| 1,750 | ¼ | 4,545 | 12,590 | 16,130 | 23,200 |
| 4,500 | ¼ | 1,935 | 7,740 | 11,295 | 21,680 |
| 7,000 | ¼ | 1,150 | 4,640 | 7,740 | 19,710 |
| 9,400 | ¼ | 685 | 3,050 | 5,315 | 18,345 |
| 1,750 | ⅒ | 2,960 | 14,370 | 22,470 | 41,635 |
| 4,500 | ⅒ | 1,150 | 5,965 | 9,250 | 34,105 |
| 7,000 | ⅒ | 620 | 2,765 | 4,365 | 27,880 |
| 9,400 | ⅒ | 220 | 1,480 | 1,895 | 22,465 |

The data show that again the strong, hard Tensleep formation resisted penetration by even the steel balls, so high fracture flow capacity resulted from use of these strong, relatively slightly deformed props. The alloy deformed less than the aluminum, so produced results which were generally somewhat better. Again, the deformation of the aluminum props, which touched each other in the full layer, filled the rather small flow paths between the props and greatly decreased fracture flow capacity.

It will be apparent from the data in Tables III to VI that the hardness of the formation can be very important in the case of low concentrations of nutshells and steel, for example. If a formation is known to be as hard and strong as the Tensleep, then a low concentration of steel props will produce excellent results. Suppose, however, that the hardness is not known and happens to be in the same range of hardness as the Cardium formation. Then if a low concentration of steel props is used in a deep formation, the rather remarkably poor results shown in Tables IV and V will result. For this reason, a method was devised for measuring the hardnesses of various formations. In this method, a ball, 0.05 inch in diameter, of a high-speed tool steel is pressed against a core of the formation in question. The load is increased until the ball forms a dent in the formation about 0.02 to about 0.04 inch in diameter. The load, in pounds, required to cause a dent within this range is then a measure of the hardness of the formation. The harder the formation, the greater the load which is required. It is preferred to make at least about there measurements and take the average of the three readings. To compensate for variations in the sizes of the dents, the load should be divided by the cross-sectional area of the portion of the ball which is imbedded ($\pi d^2/4$, where $d$ is the diameter of the dent) to obtain a value in pounds per square inch. This value will be hereinafter called the hardness factor of the formation. Hardness factors for various formations are presented in Table VII.

Table VII

| Formation: | Hardness factor, p.s.i. |
|---|---|
| Annona chalk | 49,700 |
| Cardium | 51,800 to 111,800 |
| Tensleep | 312,300 |
| San Andres | 130,000 to 316,000 |
| Bromide | 180,000 |

The San Andres cores were obtained from wells in Texas. Two values are given for cores taken from two different fields. The wide variation shows how the hardness of a given formation can vary over an area. The bromide sample was obtained from a well in Oklahoma. Two values are also given for the Cardium sand. These represent hardness values for two different cores, but in this case both cores were taken from the same field. Again the point is illustrated that it is difficult to predict the hardness of a formation. This emphasizes the importance of using a propping material, such as the aluminum alloy used in obtaining the data in Tables III to VI, which works well over a wide range of concentrations in formations having a wide range of hardnesses. The Annona chalk was the softest formation tested. Still softer ones are sometimes found. The Annona chalk and the Cardium formation are examples of actual producing formations which are frequently fractured and are thus representative of formations frequently encountered in fracturing operations. The softer of the Cardium cores was used in obtaining the data in Tables IV and V.

The above tables present data on five of the seven variables. The two remaining variables are particle size distribution in the props and length of time the props are exposed to overburden pressure. The data in Table VIII are pertinent to the question of the effects of particle size distribution.

Table VIII

| Sample No. | Particle size | | Flow capacity, millidarcy-feet |
|---|---|---|---|
| | Through | Retained on | |
| 1 | 12 | 14 | 19,500 |
| 2 | 14 | 16 | 13,500 |
| 3 | 16 | 18 | 10,400 |
| 4* | 12 | 18 | 13,700 |

*⅓ each of Samples 1, 2 and 3.

The particle sizes are stated in terms of U.S. standard sieve numbers. Tensleep cores were used with an overburden pressure equivalent to 11,600 feet. The concentration of props in each case was about ⅓ of a full layer. The material of which the props were made was an aluminum alloy of unknown composition. The method of forming the approximately spherical particles was also unknown. The important point is that a distribution of deformable particles throughout a wide range produced about the same results as particles in a narrower range, but having about the same average size. Particles which will barely pass a 12-mesh sieve are about 0.066 inch in diameter. Particles which will barely pass an 18-mesh sieve are about 0.039 inch. Thus, it is apparent that if the smaller particles are at least ½ as large as the larger particles, little decrease in flow capacity of the fracture results. This has been previously shown in the art by use of 20 to 40-mesh sand in which about the same ratio of small to large particles exists. In the case of sand this is close to the largest ratio that can be tolerated because, as explained above, the fracture faces in closing down on the props contact and crush the larger sand particles first before the faces reach the smaller props. This crushing action in the case of sand produces many smaller particles which tend to plug the passages between larger particles and thus decrease the flow capacity of the fracture.

In the case of the malleable metallic props, however, the large props simply deform without shattering until the formation contacts the smaller props. This permits the use of a much wider distribution of sizes in the malleable props. It is still preferred to have a distribution in which the small props are at least ½ as large as the larger props, but mixtures in which the largest dimension of the large props is four or five times that of the small props can be used, if necessary.

An examination of the data in Tables III to VI, inclusive, shows that the larger the props, the higher the fracture capacity when metallic props are used. Therefore, it will be apparent that it will advisable to use the largest props which can be deposited in a fracture. The various techniques suggested for depositing walnut shells are also applicable to metallic props. One distinction should be noted, however. The metallic props are much more effective than sand, even in the range from 20 to 40 mesh size. Therefore, if the size of the props is tapered from very small at the first to very large at the last of a fracturing operation, it may be advisable to use only metallic props rather than using sand as the small propping material, as suggested with nutshells. For example, the metallic props may vary from about 40 mesh or even smaller at the start to 4 mesh or even larger at the end.

It should also be noted that the small malleable metallic props may be used throughout the fracture job. That is, props of a uniform size such as 20 to 25 mesh or even 30 to 40 mesh may be used throughout the entire fracture, if desired. The data in Table V and VI show that very good results, much better than those provided by sand, can be produced by use of such small malleable metallic props, particularly when these are diluted to form only ½ to ⅟₁₀ a full layer within the fracture. Therefore, in areas where larger props cannot be used, the smaller ones can be employed with considerable advantage.

The use of small props may complicate the use of multiple fracturing operations. A small fracture can be easily sealed. Therefore, if the props are small and the temporary diluting particles are even smaller, a composition may result which approaches that used in sealing fractures in multiple fracturing operations. Two precautions should be taken to prevent sealing of a fracture by props diluted with small temporary diluting particles. First, the diluting particles themselves should be no smaller than about 40 mesh when they are introduced into a well. This will allow for some solution and mechanical disintegration on the way down the well, the diluting particles still being rather large when entering the fracture. These large particles have large passages between them. The passages, in turn, allow the flow of sufficiently large amounts of fracturing fluid into the fracture to keep it forced open so the props and diluting temporary particles can readily enter the fracture and flow back into the fracture away from the well. The second precaution is to pump at as high a rate as possible, again to keep the fracture forced open as wide as possible to permit entry of the diluted props into the fracture. In addition, it will be advisable to use diluting particles which are no larger than the props. This will avoid the danger of the diluting particles bridging across the fracture at the well bore face and possible sealing the fracture.

If it is desired to seal a fracture, on the other hand, larger, strong bridging particles, preferably in the 4 to 10-mesh range, should be used and the range of sizes of temporary particles should extend down to those barely retainable on a number 100 sieve, for example. In addition, the pumping rate should be slow and the pumps should even be stopped entirely occasionally. These provisions will permit the fracture to close as much as possible and insure that a bridge and seal will form over the face of the fracture.

As in the case of walnut shells, several methods may be used to obtain a low concentration of malleable metal props in a fracture. Some of the methods employ temporary diluting materials, while others do not. Several of these are discussed in connection with the walnut shells. Still others will be apparent to those skilled in the art.

In Table IX data are presented on the effects of the period of time over which the props are exposed to overburden pressure. In these tests the formation was the Tensleep. The prop concentration was about 20% of a full layer and the prop size was about 14 to 18 mesh. Two of the props were silicon-aluminum alloys. One alloy contained 3 percent and one 6 percent silicon as indicated. In both these cases the load applied to the props was equivalent to an overburden of 11,600 feet. In the case of the aluminum props the load was decreased to simulate about 5,000 feet of overburden since, as shown in Table III, the aluminum deforms rather badly at a depth of 11,600 feet.

Table IX

| Props | Overburden depth, ft. | Time of exposure to pressure, days | Fracture flow capacity | |
|---|---|---|---|---|
| | | | Md.-ft. | Percent decrease |
| Aluminum alloy (6% silicon). | 11,600 | 0 | 20,500 | |
| | 11,600 | 2 | 13,100 | 31 |
| | 11,600 | 7 | 11,500 | 44 |
| | 11,600 | 21 | 11,400 | 45 |
| | 11,600 | 0 | 20,400 | |
| | 11,600 | 8 | 13,400 | 34 |
| | 11,600 | 32 | 12,800 | 37 |
| Aluminum alloy (3% silicon). | 5,000 | 0 | 20,600 | |
| | 5,000 | 13 | 16,400 | 16 |
| | 5,000 | 49 | 14,600 | 29 |
| | 5,000 | 97 | 14,500 | 30 |

These data illustrate several points. First, it is apparent that even the strong 6 percent silicon alloy props continued to deform at least slightly for several days after the load was imposed on them, resulting in a decrease in fracture flow capacity. Second, after a period of a month or so the fracture flow capacity approached a constant value indicating the props had deformed sufficiently to support the overburden. Third, short period tests give flow capacity values somewhat higher than the final long-range equilibrium values, but the short-range results were close enough to the long-range results to justify comparing the propping abilities of various materials on the basis of the short-term values. The tests also indicated that by taking a value of about 50 percent of the short-range flow capacity, a conservative figure is provided for the long-range equilibrium value.

Turning now to the question of suitable spacer materials for the malleable metallic props, one principal difference between the metals and walnut shells should be noted. This is specific gravity or density. The specific gravity of walnut shells compared to water is about 1.3. That of aluminum and mild aluminum alloys is about 2.7. Other alloys, such as brass or bronze have even higher specific gravities. For best results the temporary spacer particles should be not only about the same size as the props, but should have about the same specific gravity. Thus, it will generally be desirable to use different spacer materials for aluminum and for walnut shells. For aluminum and its mild alloys, spacers having a specific gravity of about 2.7 should be used, if possible. These may be either oil-soluble or water-soluble.

Several inexpensive water-soluble materials are available which have specific gravities close to that of aluminum and aluminum alloys. Some of these, together with their specific gravities, are Sodium sulfate (anhydrous) _____ 2.70
Sodium bisulfate _____ 2.74
Potassium dichromate _____ 2.69
Ferric chloride _____ 2.80
Sodium sulfite (anhydrous) _____ 2.63
Sodium dichromate _____ 2.52
Calcium chloride (anhydrous) _____ 2.51

For other alloys even heavier spacer materials are available, such as

Zinc chloride _____ 2.91
Cupric chloride (anhydrous) _____ 3.05
Nickel chloride (anhydrous) _____ 3.55
Zince sulfate (anhydrous) _____ 3.74
Lead nitrate _____ 4.53

The materials listed are by way of example only. Other spacer materials suitable for any particular circumstances or for any specific props can be found by reference to handbooks.

If oil-soluble spacers are desired, it is possible to use materials such as lead stearate, hexachlorocyclohexane, or the like, which have high specific gravities. Still other oil-soluble materials, such as carbon-tetrabromide, have specific gravities more nearly approaching that of aluminum. There are few, if any, oil-soluble spacer materials having specific gravities as high as 2.7, however, which may be considered sufficiently inexpensive for use in the range of volumes required in fracturing operations. Many of the less expensive oil-soluble spacer materials are sufficiently close to the density of aluminum to be used without modification, but it may be desirable to increase the specific gravities to values more nearly approaching that of aluminum. This can be done easily by mixing in a finely divided solid, such as zinc sulfate. Even if water is used as a fracturing fluid, the water-insoluble material into which the water-soluble weighting agent is mixed will protect the water-soluble material and prevent its solution by water until the oil-soluble material has been removed by flow of oil after the fracturing operation has been completed.

It is also possible to use solids such as barium sulfate which are insoluble in both oil and water to increase the density of oil-soluble spacers. If the barium sulfate is sufficiently finely divided to flow easily through the passages between the props in the fracture, the fact that the weighting agent is not soluble is not a serious disadvantage. As mentioned in connection with the walnut shells, particles passing a 325-mesh sieve are sufficiently finely divided to give little difficulty. The barium sulfate normally used as a drilling fluid additive is readily available in this range of sizes.

If a weighting agent is to be mixed with the oil-soluble spacer material, it will be apparent that the low specific gravity oil-soluble materials may be used. These may include materials such as naphthalene or resins manufactured from coumarone, indene, dicyclopentadiene, or the like mentioned in connection with spacing of the nutshells. Powdered barium sulfate, limestone, or the like can be mixed into these oil-soluble materials to increase the density of the spacer pellets to values at least more nearly approaching that of aluminum or other malleable metal or alloy props. For example, the oil-soluble material may be melted, the weighting agent stirred in and the mixture allowed to solidify.

The unfavorable segregation effects due to differences in specific gravities of spacers and props can also be decreased, if not overcome entirely by increasing the viscosity of the carrying liquid. If this fluid is viscous enough, it will carry the spacers and props along together almost independently of differences in specific gravity, size or shape. It might not be too advisable to rely on a viscous carrying liquid to carry along brass props and unweighted naphthalene spacers, to state a rather extreme example. It will be apparent, however, that by the use of a somewhat viscous carrying liquid it will be possible to tolerate a considerable mismatch of specific gravities. For example, if the props are an aluminum alloy with a specific gravity of about 2.7, it is possible to use ordinary sodium chloride rock salt of the proper size range as the spacer material. This is possible even though the rock salt has a specific gravity of only about 2.2.

It will also be apparent that there is considerable leeway in the ratio of props to spacer materials. Therefore, some separation of the two materials can be permitted in the fracture while still staying within the limits of 1 to 10 times as large a volume of spacers as of props. This means that a considerable mismatch in specific gravities of props and spacers can be tolerated even if unthickened oil or water is used as the carrier liquid. For best results, however, props and spacers of closely matching specific gravities should be used. For our purposes the props and diluents can be said to have substantially the same specific gravities if they differ by only about 10 percent. This means that if the inexpensive diluting materials, such as sodium sulfate, are to be used with props having substantially the same specific gravity, there is a considerable advantage in using aluminum alloys having a specific gravity no greater than about 3.0 compared to water.

It may sometimes be advisable to refer to concentrations of props or diluents in terms of pounds of particles per gallon of carrying liquid. Due to the differences in density which may exist, it is well to refer back to the concentrations specified for walnut shells and modify these for the various specific gravities. For example, in the discussion of nutshells a concentration of from about $\frac{1}{20}$ to about 1 pound of nutshells per gallon of carrying fluid is recommended. If aluminum is substituted for walnut shells, the question is what weight of aluminum props of the same size as those of walnut shells should be used to provide the same number of props. The specific gravities of aluminum and nutshells are 2.7 and 1.3 respectively. Therefore, it is apparent that the weight of aluminum should be about twice the weight of nutshells to give the same number of props of a certain size. That is, the weight of aluminum should be from about $\frac{1}{20}$ times 2.7/1.3 to about 1 times 2.7/1.3. Putting these values in general terms, where the specific gravity is represented by the letter "$s$," the weight should be from about $\frac{1}{20}$ times $s/1.3$ to about 1 times $s/1.3$. These terms reduce to $s/26$ and $s/1.3$. Thus, the concentration of props of a material with a specific gravity of $s$ compared to water should be from about $s/26$ to about $s/1.3$ pounds per gallon of fracturing fluid.

In connection with the expense of the diluting materials, the economic advantage of using these materials should be pointed out. Some of the diluting materials can be obtained for only a few cents per pound. The metallic props, on the other hand, may be quite expensive. By using a mixture containing considerably more diluting particles than metallic props, the cost is brought down to a value not much greater than some of the sand which is used for propping fractures. This means that the diluted metallic props can be used economically in shallow wells as well as in deeper wells where the metallic props have their greatest advantage over sand props which shatter badly due to high overburden loads.

When temporary diluting particles are used with the malleable props, the removal of such temporary particles must be considered. If oil-soluble diluents are used for fracturing an oil-producing formation, or if water-soluble materials are used in a water well, there is little problem. If water-soluble diluting particles are used with the props in a fracture in an oil-bearing zone, however, there might be some question regarding the removal of the water-soluble particles. Actually, there are few oil-bearing zones which do not produce at least a small amount of water with the oil. This water contacts the water-soluble material and slowly dissolves it. Thus, the water soluble particles are eventually dissolved although the rate may be somewhat slower than desired. In such cases it may be desirable to follow the prop-placing step by a step in which water is flushed back into the fracture and is allowed to return to the well to remove the diluting particles. Tests in the laboratory with such materials as rock salt and sulfamic acid showed these water-soluble materials were easily removed, by a washing action, from a fracture containing metallic props. Other tests with diluting particles of materials such as asphalt, naphthalene, and the like showed these were easily removed by flow of oil.

If too high a concentration of malleable metal props has been deposited in the fracture, whether intentionally or accidentally, it will be possible, of course, to decrease the concentration by dissolving some of the propping material and thus increasing the sizes of flow channels between the props. An acid such as a 15 percent aqueous solution of hydrochloric acid, for example, may be used for most props. The acid may also serve to dissolve channels in the formation adjacent the fracture and thus further increase the flow capacity of the fracture. If desired, a spacer material may be used which forms aqueous solutions corrosive to the props. For example, solutions of some of the chlorides such as calcium chloride are fairly corrosive to aluminum. Others, such as sulfamic acid, may be even more corrosive to the props and formation.

It is well to note that the corrosive action of spacers such as calcium chloride will occur whether wanted or not. Therefore, if spacers of this type are used, a little higher concentration of the metallic props should be employed to compensate for any corrosion which might occur. Many natural formation brines are also somewhat corrosive to metals such as aluminum. Tests indicate that under most conditions several years are required for corrosion by such brines to reduce the cross-sectional area of the props to one half their original size. Nevertheless, it may be advisable to increase the concentration of props somewhat to compensate for corrosion by the natural brines as well as by any corrosive diluting materials.

In connection with the corrosion of metallic props it should be noted that when a propping material is said to be insoluble in oil and water, an absolute insolubility is not necessarily intended. If the props last a year or so before becoming about one half dissolved, they may be considered satisfactory for many purposes. Longer lives are, of course, preferred. Another limitation on the malleable propping material is its melting point. The material must have a melting point somewhat above the temperature at which it is to be used. This will ordinarily be the temperature of the formation in which the fracture is to be propped open by particles of the material. With most aluminum alloys, there is little problem, but if organic polymers, such as nylon, are to be used, the formation temperature should be carefully checked. A melting point above about 500° F. is considered sufficiently high for use in any wells known today. Therefore, it may be desirable to observe this melting point as a minimum to avoid the necessity of checking the formation temperature in each case.

If the props become corroded away to such an extent that they do not adequately support the overburden, the fracture width will decrease. The flow capacity of the fracture may, therefore, eventually decrease to an undesirably low value. In this case it will, of course, be possible simply to place another batch of props in the fracture. It is also possible to place props of malleable materials in old fractures in which sand has been used as a propping material. In such cases, a high flow rate of liquid into the fracture is generally desirable to extend the fracture and push the old propping agent back away from the well, leaving the portion of the fracture near the well open for the new malleable props.

It will be apparent that our process may be used either to form new fractures, to extend old ones, or even to prop open old fractures without extending them. Thus, when reference is made to a composition for forming and propping a fracture, the composition may be used for either forming the fracture, propping the fracture, or both. Similarly, when reference is made to a method for increasing the rate of flow of fluids through a fracture, this method may be applied to fractures existing before the prop-placing step is undertaken or may be included as a part of the method for formation of a new fracture into which the props are placed.

Figure 3:
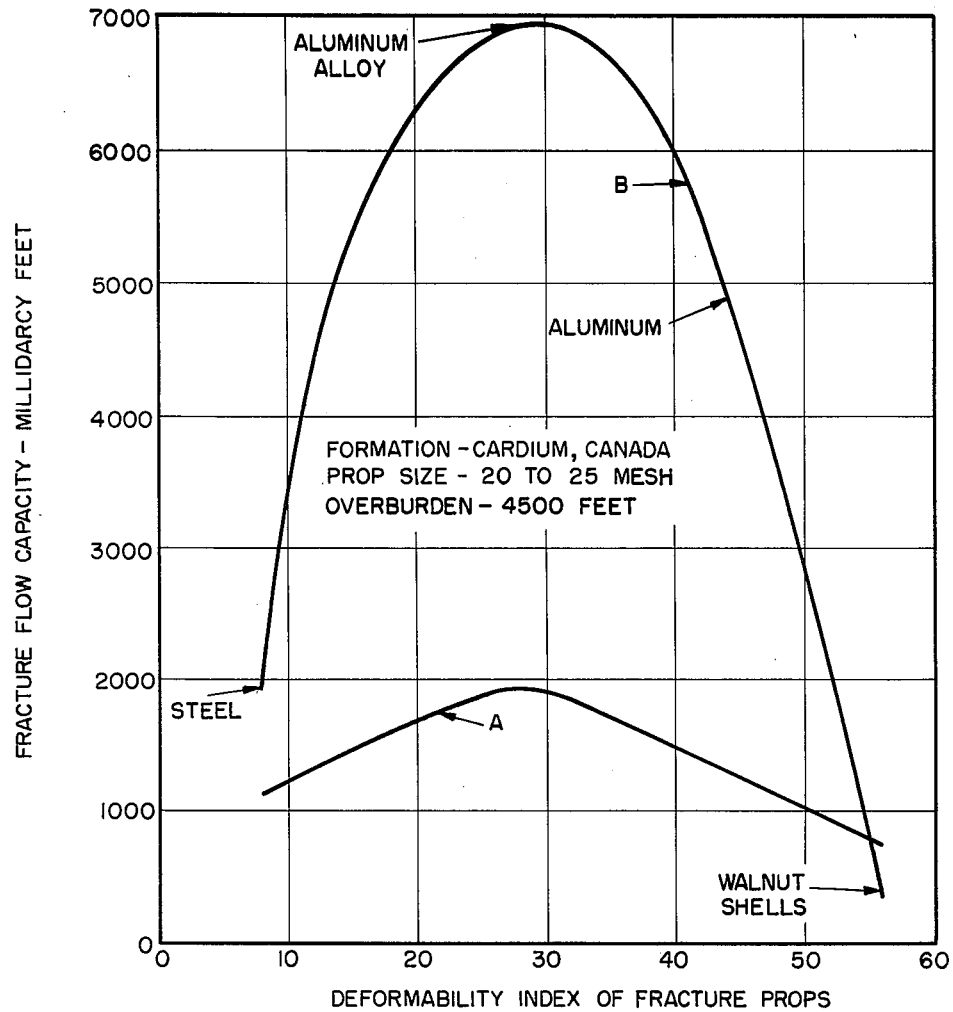

In FIGURE 3, the abscissa is in terms of a deformability index. It seems necessary to define such a term so the difficulties can be avoided of using a malleable prop which is either too deformable or not deformable enough. This index is determined by compressing a spherical ball of the propping material between hard strong plates, such as tungsten carbide, and measuring the amount of reduction in diameter of the ball. In this measurement two variables must be taken into consideration. One is the deforming force imposed on the sphere. The other is the size of the sphere.

If a load of 100 pounds is imposed on spheres of various materials, 0.05 inch in diameter, between tungsten carbide plates, for example, the percent deformation provides a direct comparison of the deformabilities of the materials. If the spheres vary in size, however, a correction should be made in the load.

We have found that at least minor variations in diameter can be compensated for if the load is adjusted so that $L/D^2$ is about 20,000 where L is the load on the sphere in pounds and D is the diameter of the sphere in inches. If the diameter of any sphere being tested is first measured and the load imposed upon that sphere is then adjusted to establish the relationship stated above, then the deformability factor will be simply the percent decrease in the dimension of the sphere in a direction parallel to the direction in which the force was imposed. Since the factor is of an empirical nature, it is advisable to apply it only to spheres within the range of about .04 to about .07 inch in diameter. If the deformability of the props is not too critical, then the factor may be applied to spheres somewhat outside this range. In cases where the factor is highly critical, however, the measurement should be made on props within the specified range. Table X presents deformability indexes for several materials.

*Table X*

| Material: | Deformability index |
|---|---|
| Walnut shells | 56 |
| Aluminum | 44 |
| 6% silicon aluminum alloy | 29 |
| Aluminum alloy 5052 | 25 |
| Steel shot | 8 |

The aluminum, 6 percent silicon aluminum alloys, and steel shot are the materials employed in the tests resulting in FIGURE 3 of the drawing. The aluminum alloy 5052 is commonly used for purposes such as manufacturing boats. This alloy contains from about 2 to about 3 percent magnesium together with traces of other metals such as silicon, iron, copper, manganese, chromium, zinc, and the like. The total of trace metals ordinarily does not exceed about 1 percent, however. It will be apparent that this alloy is in the same range of deformability as the 6 percent silicon alloy and is, therefore, within the limits of the preferred group of aluminum alloys. Aluminum alloys containing up to about 6 percent of magnesium have very good properties. Aluminum alloys consisting essentially of aluminum and from about 2 to about 6 percent of magnesium should be considered a preferred class of aluminum alloys. With regard to such alloys the term "consisting essentially of" should be interpreted to include alloys containing the named metals plus trace metals amounting to up to about 1 percent of the total weight of the alloy and having substantially no detrimental effects on the properties of the alloy.

It will be apparent that many other alloys of aluminum, magnesium, copper, beryllium, titanium and other metals may be employed, if desired. These alloys should meet the deformability index requirements set out below and should also be able to withstand the corrosive effects of formation brines for a substantial period of time, such as a year or so. The deformability index applies, of course, only to malleable metals, alloys and other materials which will deform without shattering. Aluminum alloy containing 50 percent silicon, for example, is fairly hard but shatters easily when a load is applied. Some steel shot approach the limit of malleability in that they tend to split into two or more portions when a load is imposed. For our purposes a malleable prop should remain in one piece, even though split and cracked, up to a reduction in diameter of about 70 percent.

The deformability index for most materials will be substantially the same at room temperature and at formation temperature. Many materials, such as nylon, however, tend to soften and weaken at a temperature somewhat below the melting point. If use of such a material is contemplated, the deformability index should be determined at the formation temperature.

With the deformability index defined, the applications and limits of the malleable fracture props can be summarized. In doing so, several features shown in Tables III to VI, inclusive, should be noted.

(1) Ordinarily, there is little point in using props small enough to pass a 20-mesh sieve, when made of a material having a deformability index similarly to that of walnut shells, since such props produce results better than those produced by sand only under a very narrow set of conditions.

(2) The same is true of small props in the deformability index range of aluminum when used in full layer concentrations.

(3) When even small aluminum props are diluted with temporary diluting particles, however, excellent results are obtained in soft and hard formations, even at great depth.

(4) Props of materials with very low deformability indexes such as steel do especially well, whether large or small, when used in a hard formation such as the Tensleep. The results with highly diluted large steel props in the Tensleep formation are particular remarkable.

(5) Steel props in softer formations such as the Cardium, however, imbed the formation and produce rather remarkably poor results when the concentration is too low or when small props are used and a full layer of props is deposited in the fracture.

(6) Props of materials with a deformability index in the range of the 6 percent silicon alloy of aluminum always produce good results, whether in low concentration or high, whether the props are small or large, and whether the formation is soft or hard. Other props may produce somewhat better results under some conditions, but no other propping materials produce the consistently trouble-free results of the proper type of aluminum alloy.

These factors indicate that two major concepts and at least two minor ones are outlined by the data. These four concepts form the basis of the claims. The two major concepts are:

(A) If the prop size is limited to the 4 to 20-mesh range, if the props are made of a malleable material having a deformability index in the range of about 5 to about 60, and if the props are deposited in a fracture in a concentration of from about 50 percent to about 20 percent of a full layer, then the results will be much better than those produced by using sand as a propping material.

(B) If the props are made of a malleable material having a deformability index within the narrow range of about 15 to about 35, then excellent results will be obtained for props sizes from about 4 to about 40-mesh for formations of a wide range of hardness and for concentrations in the fracture from a full layer down to about 10 percent of a full layer. This means that if there is any question regarding the hardness of the formation or the prop concentration produced by any particular method, props of the aluminum alloy characteristics should be used.

The two minor concepts are:

(C) If the hardness factor of the formation is known to be at least about 300,000, then the concentration of materials having a deformability factor in the range of about 55, characteristic of walnut shells, can be used in a concentration as low as about 10 percent of a full layer in a fracture, but the props should still be larger than 20-mesh in size.

(D) If the formation has a hardness factor of at least about 300,000, then props having a low deformability factor of about 10, characteristic of steel, not only can be used in low concentrations of about 10 percent of a full layer, but by far the best results are obtained by use of these little-deformed props in this low concentration, whether the props are large or small.

The methods, compositions and limits have been carefully defined above to produce fractures having high flow capacities. These flow capacities are stated in units of millidarcy-feet. This is in accordance with practices used in well productivity calculations such as those suggested on page 91 of "Fundamentals of Reservoir Engineering," by John C. Calhoun, Jr., University of Oklahoma Press. Another reference which is pertinent in this regard is the article "Reservoir Fracturing—A Method of Oil Recovery From Extremely Low Permeability Formations," by L. E. Wilsey and W. G. Bearden on page 21 of the August 1954 issue of the Journal of Petroleum Technology. Simply stated, a flow capacity in millidarcy-feet is the permeability of the fracture multiplied by its height or, as more commonly stated, its width, in feet. Since both the permeability and width may vary when one prop is substituted for another, expression of the flow capacity of the fracture in terms of millidarcy-feet seemed simpler and more significant than attempting to express permeability and fracture width separately.

With regard to the effects of increased flow capacity of a fracture, the article by Wilsey and Bearden presents most of the basic considerations. It should be noted, however, that Wilsey and Bearden considered only fractures having flow capacities in the range of 30 to 300 millidarcy-feet since these are typical of those produced by sand props. Their conclusions should be reconsidered in view of the very high fracture flow capacities provided by our malleable props and prop dilution techniques. There are two principal effects. First, the benefits of long fracture radii are even greater with high flow capacity fractures. With such fractures, most of the resistance to flow occurs in the formation rather than the fracture. Therefore, there is a greater advantage in exposing more formation to the fracture. This means that if a high flow capacity fracture is to be formed by our composition and techniques, it will ordinarily be economically justifiable to form a fracture with a larger radius than might be justified when sand is used to produce fractures having lower flow capacities.

The other effect is to make advantageous the application of fracturing to higher permeability formations. If a formation already has a fairly high flow capacity, there is little point in forming a low flow capacity fracture in it. A very high flow capacity fracture, such as those produced by our compositions and methods, however, makes worthwhile the reconsideration of the advisability of fracturing all formations which have not previously been fractured.

Still other advantages of high flow capacity fractures will occur to those skilled in the art. Therefore, we do not wish to be limited to the particular applications and advantages which have been given above, principally by way of example. Our invention should be interpreted rather as limited only by the following claims:

We claim:

1. A composition for forming and propping a fracture in an earth formation, said composition consisting essentially of a carrying liquid, granular particles of a propping material insoluble in oil and water, capable of deforming under load without shattering, having a melting point above the highest temperature to which the material will be subjected, and having a deformability index of from about 5 to about 60, and particles of a temporary diluting material, said carrying liquid being selected from the group consisting of water, mineral oil, and mixtures of water and mineral oil, said particles of propping material being present in a concentration of at least about $s/26$ pound per gallon of said liquid, where $s$ is the specific gravity of said propping material compared to water, said particles of propping material being substantially in the size range passing a number 4 U.S. standard sieve and retained on a Number 20 U.S. standard sieve, the average minimum dimension of said particles of propping material being at least about ½ the average maximum dimension, said particles of temporary diluting material being present in a concentration from about one to about 4 times the volume of said particles of propping material, said particles of temporary diluting material being substantially in the size range passing a Number 4 U.S. standard sieve and retained on a Number 40 U.S. standard sieve, and said temporary material having a melting point greater than the temperature of the formation to be fractured and being selected from the group consisting of oil soluble solids and water soluble solids.

2. The method of increasing the flow of fluids through a formation surrounding a well penetrating said formation comprising injecting through said well and into a fracture in said formation the composition of claim 1 whereby when formation fluids later flow through said fracture, said temporary diluting material is removed, leaving the fracture propped open by widely-spaced individual particles of said propping material to form channels having high flow capacities for flow of fluids through said fracture.

3. The composition of claim 1 in which said diluting material has substantially the same specific gravity as that of said propping material.

4. The method of increasing the flow of fluids through a formation surrounding a well penetrating said formation comprising injecting through said well and into a fracture in said formation the composition of claim 3 whereby when formation fluids later flow through said fracture, said temporary diluting material is removed, leaving the fracture propped open by widely-spaced individual particles of said propping material to form channels having high flow capacities for flow of fluids through said fracture.

5. A composition for forming and propping a fracture in an earth formation, said composition consisting essentially of a carrying liquid, granular particles of a propping material insoluble in oil and water, capable of deforming under load without shattering, having a melting point above the highest temperature to which the material will be subjected, and having a deformability index from about 15 to about 35, and particles of a temporary diluting material, said carrying liquid being selected from the group consisting of water, mineral oil, and mixtures of water and mineral oil, said particles of propping material being present in a concentration of at least about $s/26$ pound per gallon of said liquid, where $s$ is the specific gravity of said propping material compared to water, said particles of propping material being substantially in the size range passing a Number 4 U.S. standard sieve and retained on a Number 40 U.S. standard sieve, the average minimum dimension of said particles of propping material being at least about ½ the average maximum dimension, said particles of temporary diluting material being present in a concentration from about one to about 9 times the volume of said particles of propping material, said particles of temporary diluting material being substantially in the size range passing a Number 4 U.S. standard sieve and retained on a Number 40 U.S. standard sieve, and said temporary material having a melting point greater than the temperature of the formation to be fractured and being selected from the group consisting of oil soluble solids and water soluble solids.

6. The method of increasing the flow of fluids through a formation surrounding a well penetrating said formation comprising injecting through said well and into a fracture in said formation the composition of claim 5 whereby when formation fluids later flow through said fracture, said temporary diluting material is removed, leaving the fracture propped open by widely-spaced individual particles of said propping material to form channels having high flow capacities for flow of fluids through said fracture.

7. The method of claim 6 in which said propping material is an alloy of aluminum having a specific gravity less than about 3.0 compared to water.

8. The method of claim 7 in which said alloy consists essentially of aluminum and from about 3 to about 6 percent by weight of silicon.

9. The method of claim 7 in which said alloy consists essentially of aluminum and from about 2 to about 6 percent by weight of magnesium.

10. The composition of claim 5 in which said propping material is an alloy of aluminum having a specific gravity less than about 3.0 compared to water.

11. The composition of claim 10 in which said alloy consists essentially of aluminum and from about 3 to about 6 percent by weight of silicon.

12. The composition of claim 10 in which said alloy consists essentially of aluminum and from about 2 to about 6 percent by weight of magnesium.

13. An additive for fracturing liquids used for fracturing an earth formation penetrated by a well, said additive consisting essentially of a combination of granular particles of a propping material insoluble in oil and water, capable of deforming under load without shattering, having a melting point above the highest temperature to which the material will be subjected, and having a deformability index of from about 5 to about 60, and particles of a temporary diluting material having a melting point greater than the temperature of the formation to be fractured and being selected from the group consisting of oil soluble solids and water soluble solids, said particles of propping material being substantially in the size range passing a Number 4 U.S. standard sieve and retained on a Number 20 U.S. standard sieve, the average minimum dimension of said particles of propping material being at least about ½ the average maximum dimension, and said particles of temporary diluting material being present in a concentration from about one to about four times the volume of said particles of propping material and being substantially in the size range passing a Number 4 U.S. standard sieve and retained on a Number 40 U.S. standard sieve.

14. The additive of claim 13 in which said diluting material has substantially the same specific gravity as that of said propping material.

15. An additive for fracturing liquids used for fracturing an earth formation penetrated by a well, said additive consisting essentially of a combination of granular particles of a propping material insoluble in oil and water, capable of deforming under load without shattering, having a melting point above the highest temperature to which the material will be subjected, and having a deformability index of from about 15 to about 35, and particles of a temporary diluting material having a melting point greater than the temperature of the formation to be fractured and being selected from the group consisting of oil soluble solids and water soluble solids, said particles of propping material being substantially in the size range passing a Number 4 U.S. standard sieve and retained on a Number 40 U.S. standard sieve, the average minimum dimension of said particles of propping material being at least about ½ the average maximum dimension, and said particles of temporary diluting material being present in a concentration from about one to about nine times the volume of particles of propping material and being substantially in the size range passing a Number 4 U.S. standard sieve and retained on a Number 40 U.S. standard sieve.

16. The additive of claim 15 in which said diluting material has substantially the same specific gravity as that of said propping material.

17. A method of increasing the rate of flow of fluids through a fracture in an earth formation penetrated by a well, said formation having a hardness factor of at least about 300,000, comprising placing within said fracture granular particles of a propping material and of a temporary diluting material used to space said particles of propping materials and subsequently dissolving said temporary diluting material, said propping material being insoluble in oil and water, capable of deforming under load without shattering, having a melting point above the temperature of said formation and having a deformability index of from about 5 to about 60, said temporary diluting material having a melting point above the temperature of said formation and being selected from the group consisting of said soluble solids and water soluble solids, the volume of particles of temporary diluting material being from about 1 to about 9 times the volume of particles of propping material, particles of both said propping material and said temporary diluting material being substantially in the size range passing a No. 4 U.S. standard sieve and retained on a No. 40 U.S. standard sieve.

18. The method of claim 17 in which said propping material is steel having a deformability index between about 15 and about 5.

References Cited by the Examiner

UNITED STATES PATENTS

| | | | |
|---|---|---|---|
| 2,818,118 | 12/1957 | Dixon | 166—42 |
| 2,881,837 | 4/1959 | Staudt | 166—42 |
| 2,950,247 | 8/1960 | McGuire et al. | 166—42 |
| 2,962,095 | 11/1960 | Morse | 166—42 |
| 3,075,581 | 1/1963 | Kern | 166—42.1 |
| 3,127,937 | 4/1964 | McGuire et al. | 166—42.1 |

OTHER REFERENCES

Burgess, G. K.: Light Metals and Alloys, Aluminum, Magnesium, Circular of the Bureau of Standards, No. 346, December 12, 1927, page 116, QC 1.U52 No. 346.

Anderson, R. J.: Secondary Aluminum, The Sherwood Press Inc., Cleveland, Ohio, 1931, page 461, TN 775 A68.

Earlougher, R. C. et al.: Sequestering Agents for Prevention of Scale Deposition in Oil Wells, in the Journal of Petroleum Technology, vol. 9, pp. 17–20, April 1957, TN 860 J6.

CHARLES E. O'CONNELL, *Primary Examiner.*

BENJAMIN BENDETT, *Examiner.*